United States Patent
Cedar et al.

(10) Patent No.: US 10,342,385 B2
(45) Date of Patent: *Jul. 9, 2019

(54) COMBUSTION DEVICE UTILIZING THERMOELECTRICAL GENERATION

(71) Applicant: BioLite LLC, Brooklyn, NY (US)

(72) Inventors: Jonathan N. Cedar, Brooklyn, NY (US); Alexander H. Drummond, Portland, OR (US); Monte MacDiarmid, Brooklyn, NY (US); Olev Tammer, New York, NY (US); Timothy M. Connelly, Brooklyn, NY (US); Kurtis Schultz, Bellingham, WA (US); Clay Burns, New York, NY (US)

(73) Assignee: BioLite LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,055

(22) Filed: Dec. 19, 2017

(65) Prior Publication Data

US 2018/0192822 A1  Jul. 12, 2018

Related U.S. Application Data

(63) Continuation of application No. 14/602,209, filed on Jan. 21, 2015, now Pat. No. 9,844,300.

(Continued)

(51) Int. Cl.
  *A47J 37/07* (2006.01)
  *F24B 1/00* (2006.01)
  (Continued)

(52) U.S. Cl.
  CPC ....... *A47J 37/0754* (2013.01); *A47J 37/0704* (2013.01); *A47J 37/0786* (2013.01);
  (Continued)

(58) Field of Classification Search
  CPC ..... F24B 1/18; F24B 13/00; F24B 1/19; A47J 37/0754
  (Continued)

(56) References Cited

U.S. PATENT DOCUMENTS

| 2,519,241 | A | 8/1950 | Findley |
| 3,279,452 | A | 10/1966 | Hottenroth et al. |

(Continued)

FOREIGN PATENT DOCUMENTS

| CN | 201355072 Y | 12/2009 |
| DE | 434942 C | 10/1926 |

(Continued)

OTHER PUBLICATIONS

Lertsatitthanakorn, "Study on the Electrical Performance of Combing Biomass-Fried Cookstove Thermoelectric (BITE) Generator", "Journal of Research in Engineering and Technology", Apr. 1, 2004, pp. 110-116, vol. 1, No. 2, Publisher: Kasetsart University, Published in: Thailand.

(Continued)

*Primary Examiner* — Gregory L Huson
*Assistant Examiner* — Nikhil P Mashruwala
(74) *Attorney, Agent, or Firm* — Loginov & Associates, PLLC; William A. Loginov

(57) ABSTRACT

This invention provides a portable combustion device that provides a cleaner combustion, provides a more efficient overall combustion through the use of a fan that directs a predetermined volume of airflow over the combustible fuel—typically wood or similar cellulose-based biological solids and provides a cooking surface that is a grill top. The combustion device has a combustion chamber into which the fuel source is placed for combustion. Mounted to the side of the combustion chamber is a housing that encloses the TEG, which generates an electrical output, based on a difference in (Continued)

temperature on opposing sides. Mounted onto the TEG housing and protruding into the combustion chamber through a small passageway is a heat-conducting probe and heat-conducting probe base unit.

8 Claims, 12 Drawing Sheets

Related U.S. Application Data

(60) Provisional application No. 61/929,861, filed on Jan. 21, 2014.

(51) Int. Cl.
| | |
|---|---|
| *F23L 5/02* | (2006.01) |
| *H02J 7/32* | (2006.01) |
| *F23B 20/00* | (2006.01) |
| *F24B 1/20* | (2006.01) |
| *H02J 7/00* | (2006.01) |

(52) U.S. Cl.
CPC ............... *F23B 20/00* (2013.01); *F23L 5/02* (2013.01); *F24B 1/202* (2013.01); *H02J 7/32* (2013.01); *F23M 2900/13003* (2013.01); *F24B 1/00* (2013.01); *H02J 7/0068* (2013.01); *Y02B 40/163* (2013.01)

(58) Field of Classification Search
USPC ............. 126/137, 25 B, 15 A, 501; 110/1 F
See application file for complete search history.

(56) References Cited

U.S. PATENT DOCUMENTS

| | | | |
|---|---|---|---|
| 3,868,943 A | 3/1975 | Hottenroth et al. | |
| 4,263,889 A | 4/1981 | Martenson | |
| 4,545,360 A | 10/1985 | Smith et al. | |
| 4,558,687 A | 12/1985 | Minshall | |
| 4,616,627 A | 10/1986 | Haygood | |
| 4,773,847 A | 9/1988 | Shukla et al. | |
| 5,024,208 A | 6/1991 | Hottenroth et al. | |
| 5,033,956 A | 7/1991 | Nystrom | |
| 5,168,860 A | 12/1992 | Kibourian | |
| 5,413,087 A | 5/1995 | Jean | |
| 5,516,381 A | 5/1996 | Kawai et al. | |
| 5,599,181 A | 2/1997 | Aoki | |
| 6,019,098 A | 2/2000 | Bass et al. | |
| 6,095,767 A | 8/2000 | Caughey | |
| 6,588,419 B1 | 7/2003 | Buezis et al. | |
| 6,611,117 B1 | 8/2003 | Hardt | |
| 7,168,363 B1 | 1/2007 | Brown | |
| 8,291,896 B1 | 10/2012 | Gonnella et al. | |
| 8,297,271 B2 | 10/2012 | Cedar et al. | |
| 8,851,062 B2 | 10/2014 | Cedar et al. | |
| 9,219,213 B2 * | 12/2015 | Van Der Sluis | ........ F24B 1/202 |
| 9,955,819 B2 * | 5/2018 | Chinnah | ............. A47J 37/0763 |
| 2001/0035175 A1 | 11/2001 | Lautner | |
| 2005/0037303 A1 | 2/2005 | Bachinski et al. | |
| 2007/0221205 A1 | 9/2007 | Landon | |
| 2009/0025730 A1 | 1/2009 | Pinel | |
| 2009/0165769 A1 | 7/2009 | Van Der Sluis | |
| 2010/0024799 A1 | 2/2010 | Conrad | |
| 2010/0083946 A1 | 4/2010 | Cedar et al. | |
| 2010/0258104 A1 | 10/2010 | DeFoort et al. | |
| 2011/0114074 A1 | 5/2011 | DeFoort et al. | |
| 2013/0112187 A1 | 5/2013 | Cedar et al. | |
| 2013/0143170 A1 | 6/2013 | Krebber et al. | |
| 2015/0320259 A1 | 11/2015 | Tucker | |
| 2016/0076774 A1 | 3/2016 | DeFoort et al. | |
| 2018/0031246 A1 * | 2/2018 | Barford | ................... F24B 1/003 |
| 2018/0195732 A1 * | 7/2018 | Drummond | ............... F24B 1/19 |

FOREIGN PATENT DOCUMENTS

| | | | | |
|---|---|---|---|---|
| JP | 2004156811 A | 6/2004 | | |
| WO | 2006103613 A2 | 10/2006 | | |
| WO | WO 2014149368 A1 * | 9/2014 | ............... | F23N 3/00 |

OTHER PUBLICATIONS

Juanico et al., "Comparative Analysis of Photovoltaic and Thermoelectric Panels for Powering Isolated Homes", "Journal of Renewable and Sustainable Energy", Jul. 22, 2009, No. 1-6, Publisher: American Institute of Physics, Published in: Argentina.

Mastbergen, "Development and Optimization of a Stove-Powered Thermoelectric Generator", 2008, Publisher: Colorado State University, Published in: USA.

\* cited by examiner

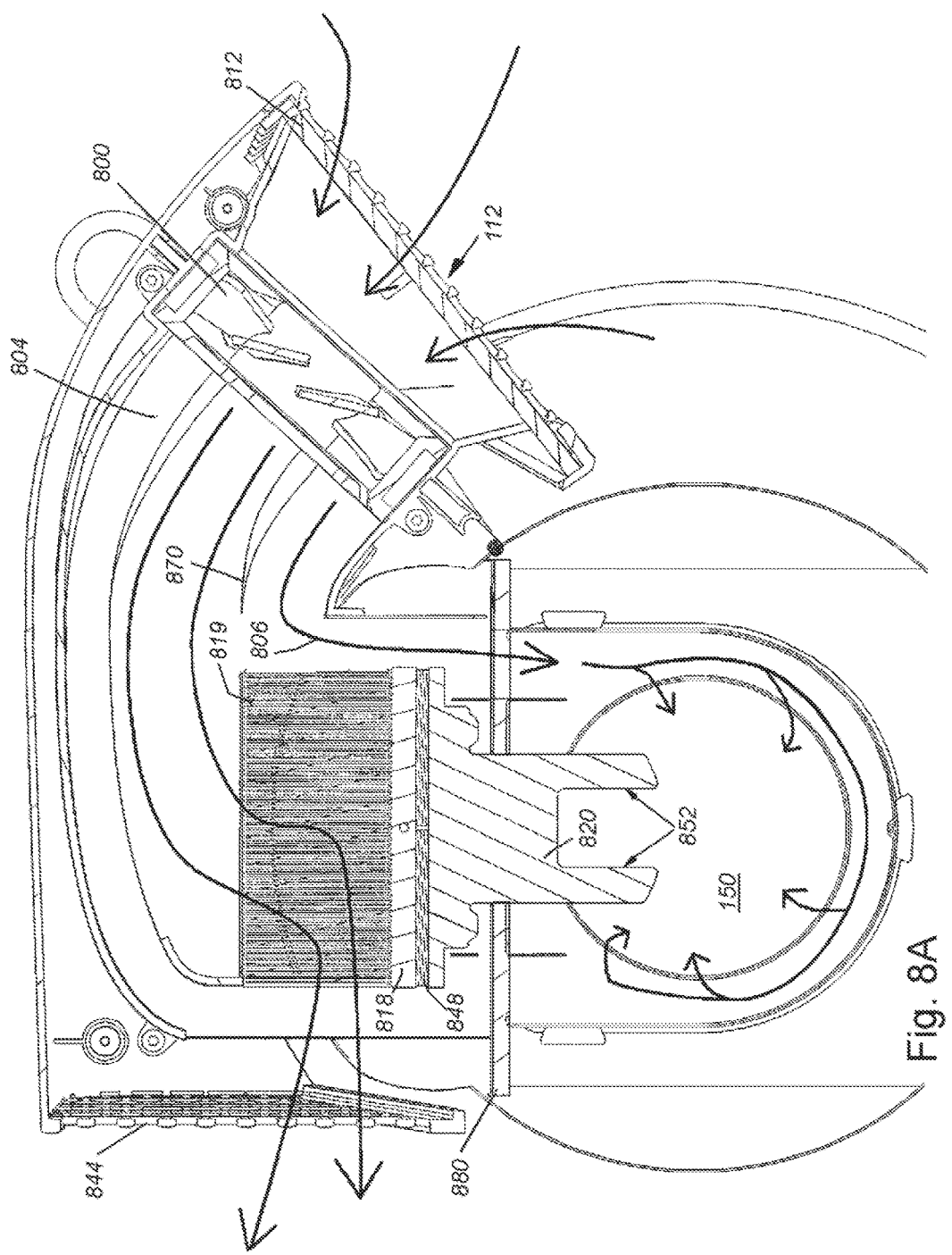

COMBUSTION DEVICE UTILIZING THERMOELECTRICAL GENERATION

RELATED APPLICATIONS

This application is a continuation of co-pending U.S. patent application Ser. No. 14/602,209, entitled PORTABLE COMBUSTION DEVICE UTILIZING THERMOELECTRICAL GENERATION, filed Jan. 21, 2015, which claims the benefit of U.S. Provisional Application Ser. No. 61/929,861, filed Jan. 21, 2014, entitled PORTABLE COMBUSTION DEVICE UTILIZING THERMOELECTRICAL GENERATION, the entire disclosure of each of which applications is herein incorporated by reference.

FIELD OF THE INVENTION

The present invention relates generally to combustion devices, such as fixed and portable cooking stoves, and more particularly to combustion arrangements that provide more efficient use of combustible materials and the energy generated therefrom.

BACKGROUND OF THE INVENTION

There exist a variety of portable combustion devices that may be used, for example, as a stove for cooking or heating, among other uses. In the past, portable combustion devices required a variety of fuels such as those used for liquid fuel stoves, portable and fixed wood stoves and compressed gas fuel stoves. These stoves were used in a variety of different situations such as for camping, emergency or rescue situations, during a power outage or a similar scenario when traditional larger-scale cooking sources (for example gas/electric cooking rages and barbeque grilles) are not available.

While previous devices did provide a combustion device, they all had the similar drawback that they all required a special fuel source. Whether the fuel was kerosene, gasoline, propane or a similar fuel source they all required some canister of fuel to be purchased and carried along with the combustion device. These canisters may be a single use canisters or multi-use canister. However, once the fuel is expended, an additional fuel canister must be supplied to maintain combustion. The availability of fuel poses a serious drawback should the canister run out, especially if used for hiking, or emergency situations. Likely, it is impossible to obtain a new canister of gas or liquid fuel while out camping or during an emergency, and even if it is possible, there is no guarantee that the person would be able to find replacements for their type of fuel and canister. Therefore the operator is required to bring extra canisters of fuel, which adds more weight, and the canisters become yet another accessory that must be carried in additional to device. Moreover, should a person need to use their portable combustion device for an extended length of time, carrying a multitude of canisters for fuel becomes impractical.

Additionally, the canisters of fuel must be disposed of properly after use. Since the canisters are often under pressure and most fuels are harmful or toxic, the canisters can not be left behind at a campsite, or during an emergency scenario. In some cases the canister may not be thrown away like other types of trash, but need to be disposed in a special manner. With a variety of fuels, canister types, and portable combustion devices, which are all made by different companies a person would limited in their options and be forced to continue to use a single fuel source.

Aside from the traditional campfire, there have been several attempts to overcome the disadvantages associated with fuel-burning cooking/heating appliances, one such attempt being a biomass combustion device or biomass stove. A biomass stove is able to burn a variety of biomass fuels such that a person would not be required to supply a compressed liquid fuel source for their portable combustion device. The user could employ whatever fuel is available to achieve the same combustion results as the previous devices. Additionally, the user need not dispose of potentially toxic canisters, and he or she would not be required to carry the appliance's fuel source with him or her. Also, whatever fuel unused, can simply be left behind.

In fact, in many developing countries some form of biomass combustion or biomass stove, burning wood chips, twigs, leaves, peat, etc. (or low-grade coal in some instances) is often used as the primary cooking device for the family meal. Generally the biomass combustion is carried out in some form of simple fire-driven stove, which is used for both heating and cooking. However, biomass devices typically have drawbacks that render them undesirable in many situations. For example, biomass stoves are not "clean" burning, that is they produce soot and smoke during the combustion process, which can cover pots, pans, or even food during the combustion. Also, the smoke generated during the combustion process can make the biomass stoves potentially dangerous for indoor use—as the smoke contains large quantities of soot and other toxic combustion products, including carbon monoxide. Nevertheless, such stoves are often used in small indoor spaces with inadequate ventilation in developing countries. In addition, many biomass stoves are heavy, making them less suitable for field use, as they are not easily portable.

One technique for increasing the efficiency of combustion is to provide a driven airflow through the biomass using powered fan, using a variety of motive power sources including, but not limited to, spring and clockwork mechanisms, compressed air/gas and electricity. In the field, the fan is typically driven by a battery or other electrical source. However, batteries may have a short life in use, and/or be discharged (dead), or be in need of recharging, when needed. In addition, batteries are expensive and often unavailable to peoples of developing countries. In addition, batteries are environmentally unfriendly and often disposed of improperly.

Accordingly, it is desirable to provide a portable combustion device that is capable of being used as a stove for cooking and/or heating, which burns commonly available wood and other biomass, and provides similar heat output as other liquid or gas fuels, without the need for batteries or disposable/refillable canisters of fuel. The stove can desirably be easy to carry, low-maintenance and burn fuel without exhausting significant soot, smoke or toxic combustion byproducts. The stove can desirably employ inexpensive and commercially available components and conventional construction techniques in its manufacture.

U.S. Pat. No. 8,297,271, issued Oct. 31, 2012, entitled PORTABLE COMBUSTION DEVICE UTILIZING THERMOELECTRICAL GENERATION, by Jonathan M. Cedar and Alexander H. Drummond, describes a portable combustion stove, the teachings of which are herein incorporated by reference.

SUMMARY OF THE INVENTION

This invention overcomes disadvantages of the prior art by providing a portable combustion device that provides a cleaner combustion and provides a more efficient overall combustion through the use of a fan that directs a predetermined volume of airflow over the combustible fuel—typically wood or similar cellulose-based biological solids. The direction of airflow is accomplished without the need for canister fuels or external power sources using the stove's own generated heat with the aid of a thermoelectric generator (TEG) and novel heat sink arrangement to generate electricity that powers the fan, and drives the airflow.

In an illustrative embodiment, the combustion device has a combustion chamber into which the fuel source is placed for combustion. Mounted to the wall (for example along a side) of the combustion chamber is a housing that encloses the TEG, which generates an electrical output based on a difference in temperature on opposing sides (a "hot side" and a "cold side") of the thermoelectric device, wherein the larger the differential, the larger the electrical output. Mounted onto the TEG housing and protruding into the combustion chamber through a small passageway is a heat-conducting probe and heat-conducting probe base unit. The heat-conducting probe is constructed from a material capable of efficiently transferring the heat generated in the combustion chamber to the heat-conducting probe base, which is in contact with the hot side of the TEG device. On the opposing cold side, the TEG is also in contact with a heat sink having a plurality of independent vanes extending from the base, which is designed to remove heat from the TEG device through interaction with ambient air that passes over the vanes from a port located along the side of the TEG housing. Additionally, the TEG housing has a motor and a airflow driver in the form of a fan (for example an axial centrifugal fan that employs moving blades, vanes or the like to drive air) near the heat sink to further draw air away from the heat sink and/or blow ambient air through the heat sink into the combustion chamber (depending in part upon where the airflow driver(s) is/are located with respect to the heat sink) and aid in the cooling of the heat sink, and to force air onto the combusting fuel through a plurality of peripheral ports that connect with an air space located between the inner and outer walls of the combustion chamber. This arrangement thereby affords the fan-driven airflow the dual purpose of cooling the cold side of the TEG to create a higher heat differential between it and the hot side of the probe and oxidizing the burning fuel, while also insulating the TEG housing from the hot inner walls of the inner flame-contacting part of the combustion chamber.

As the fuel is combusted within the combustion chamber, heat is produced. The heat creates a difference in temperature between the sides of the TEG, thus producing an electrical current output. As the temperature rises, the heat sink cools the device on the opposing side of the TEG creating an even larger temperature differential, and in turn, creating a larger electrical output. This electrical output is transmitted to the motor that is driving the fan, which in turn, draws or blows cooler ambient air across the heat sink thus promoting more efficient, oxygen-rich combustion of the fuel. This cycle essentially creates a feedback loop, which quickly increases the efficiency of the combustion once it begins.

Moreover, the airflow driver draws or blows outside air into the TEG housing to further cool down the heat sink by drawing cooler outside air across it, as well as drawing the air near the heat sink away from the heat sink. This will cool one side of the TEG device creating a larger temperature differential, which will increase the electrical output to drive motor and fan structure, which will continue to draw more into the TEG housing. Additionally, any surplus electricity from the TEG can be used as part of a cogeneration system to power a charging system for a variety of electrical or electronic devices having appropriate power consumption levels relative to the available heat energy. Such devices can include, for example a radio, light or cellphone charger. Additionally, the airflow driver draws or blows the ambient air from the heat sink and forces the air into the combustion chamber creating more turbulence within the chamber insuring a more efficient combustion. All of these components provide a system that promotes a portable or stationary combustion device which is capable of using biomass fuels that does not require canisters or an external power supply. The invention thereby provides a cleaner burning of biomass fuels, and the use of the TEG device in this configuration ensures a quicker kindling period as well as more efficient combustion. More particularly, the placement of the TEG and its heat-conducting probe, so as to receive optimized heat transfer from the flame and thereby more quickly heat the TEG, ensures quicker operation of the fan/airflow driver, and obviates the need for a startup battery. Additionally, the heat conducting probe defines a conduit for conducting heat from a remote flame or heat source. This discrete heat conduit enables a variety of many flexible design configurations where the TEG and airflow driver can be placed on the outside surface or remotely from (and typically near) any combustion device such as biomass stoves, barbeques, grills, camp fires, butane, alcohol and propane burners, and any other source of open flame and/or heat convection (for example a heated airflow).

In an illustrative embodiment, the combustion device includes a combustion chamber comprising an inner wall defining a combustion space that contains, and is in communication with, a biomass fuel source. A TEG is located outside the outer wall and including a thermally connected heat-conducting probe on a hot side thereof that extends into the combustion space. The TEG further includes a heat sink thermally connected to a cold side thereof. A motorized airflow driver is electrically connected to the TEG, and is arranged to draw air form an ambient source, over the heat sink and into the interface port so as to generate a positive pressure in the airspace and direct airflow through the plurality of ports and into the combustion space. The inner wall illustratively includes a lower and upper set of peripheral ports that allow the airflow that is driven into the space between the chamber walls to be injected into the interior of the chamber to mix with the burning fuel therein. A deflector is positioned in front of the port in the outer wall to direct the flow of air into a circular pattern, thus creating improved mixture of air and combustion gas, and generating a more-distributed flow within the space. A combustion device comprising a combustion chamber comprising an inner wall defining a combustion space that contains, and is in communication with, a biomass fuel source and an outer wall having a side-mounted interface port allowing access of airflow into the combustion space enclosed within the outer wall; a thermoelectric generator (TEG) housing located outside the outer wall and including at least one thermally connected heat-conducting probe on a hot side thereof that extends into the combustion space, the TEG further including a heat sink thermally connected to a cold side thereof; a cooking surface including a baffle, the baffle being moveable between an open condition and a closed condition; and a motorized airflow driver electrically connected to the TEG and constructed and arranged to drive air from an ambient source, over the heat sink and into the interface port so as to generate a positive pressure in the combustion space. When the baffle is in a closed baffle condition, it disperses combustion across the cooking surface. When the baffle is in an open baffle condition, it allows the combustion gasses to rise vertically up the center of the cooking surface. The cooking surface comprises a grill top. The TEG is connected to a rechargeable battery. The user interface includes a port configured to connect to an electric device such that the electric device is charged by the battery. A method of charging an electric device comprising igniting fuel within a portable combustion device to generate heat within the portable combustion device; generating an electric current using the portable combustion device based in part on heat from the fuel; charging a battery with the electric current; powering the electronic device with the battery; sensing an output voltage of the battery while powering the electronic device; and controlling the electric current generated by the portable combustion device based in part on the output voltage of the battery.

BRIEF DESCRIPTION OF THE DRAWINGS

The invention description below refers to the accompanying drawings, of which:

FIG. 8A is a schematic view of the TEG housing according to an illustrative embodiment;

DETAILED DESCRIPTION

I. General

In accordance with the present invention, there is provided a portable combustion device that generates power and heat by efficiently (i.e. cleanly) burning a biomass fuel. It should be clear that, the term "biomass" can be taken broadly to include any fuel, coal, oil, waste products, etc., that will burn more cleanly and efficiently by injection of air during combustion. Likewise, a further advantage of increased efficiency in the burning of a fuel is that less fuel is consumed for a given heat output.

Figure 1:
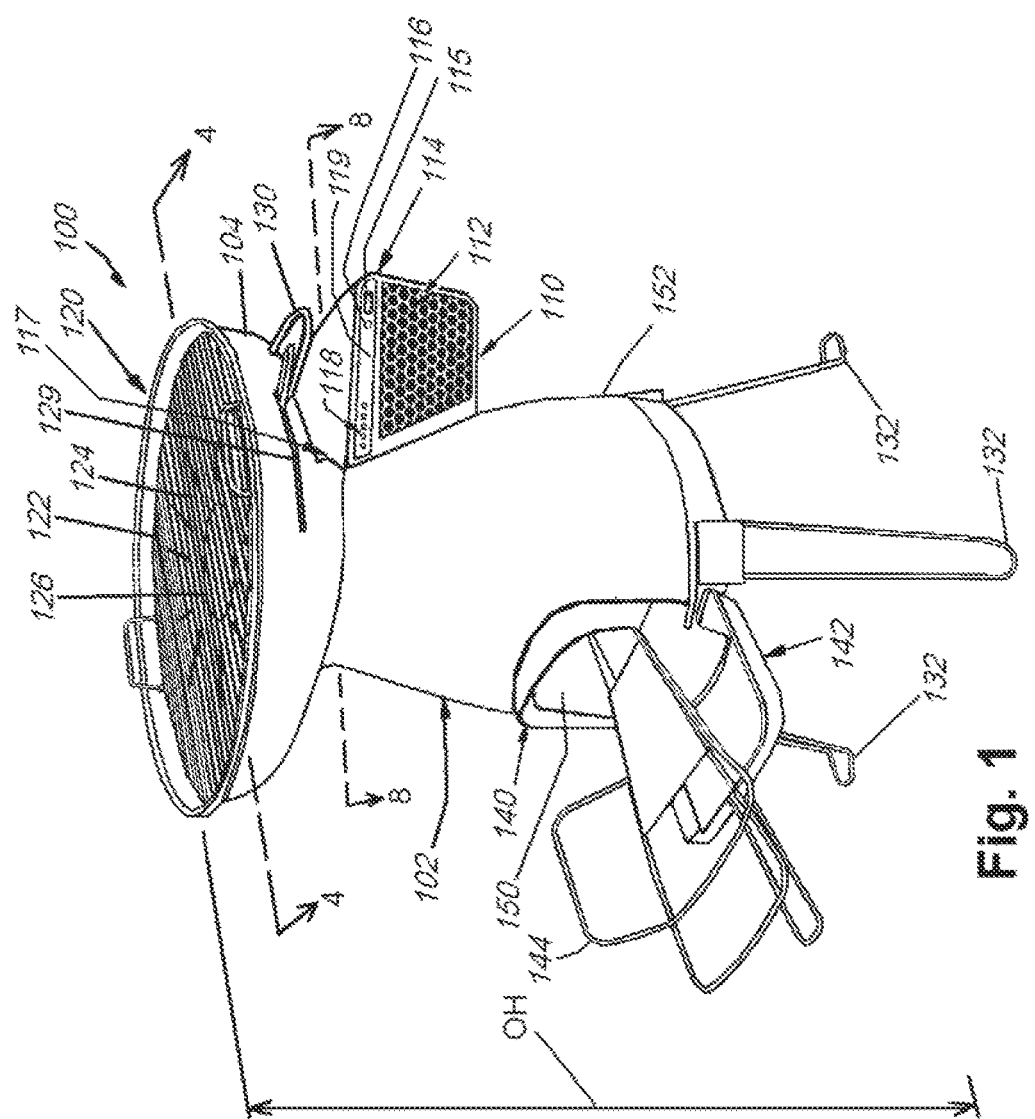
FIG. 1 is a perspective view of a portable combustion device, showing the combustion chamber and TEG housing fully assembled, according to an illustrative embodiment.

FIGS. 1-4 show various views of the portable combustion device 100 according to an illustrative embodiment of this invention. With respect to FIG. 1, the exemplary portable combustion device 100 is relatively cylindrical in shape and is comprised of an internal combustion or burn chamber 102, and a TEG (thermoelectric generator) housing 110 constructed of a durable polymer or lightweight metal, such as an aluminum casting, as shown in FIG. 1. A grill top 120 is positioned at the top of the portable combustion device, above the combustion chamber 102. The portable combustion device 100 is provided with a handle 130 for carrying, cleaning and is supported by a plurality of foldable legs 132. The overall height OH of the portable combustion device is approximately 24 inches (about 61 cm). The overall weight is approximately 20 pounds (about 9 kg). The handle 130 and legs 132 are formed of wire. In other embodiments, they can be formed of a suitable polymer. The grill top 120 is circular and is comprised of a grill grating 122, a perforated heat plate 124 and a lever operated baffle 126. The baffle lever 128 moves within a slot 129 that is formed within the outer combustion chamber wall 104 that is flared outwards at the grill top so as to be a broad cooking surface. The combustion chamber 102 is preferably made of a lightweight, durable metal, capable of withstanding the high temperature of combustion with an open flame. The depicted portable combustion device 100 is constructed from steel (e.g. stainless steel sheet having a thickness of 1/32-1/16 inch, variously) and aluminum sheet, with polymeric components where appropriate. It can be constructed of any material capable of withstanding the high temperatures of combustion supporting a weighted cooking vessel, and formed into the correct shape as required. Such temperatures can be in the range of 1200-1600 degrees F. In other embodiments, other materials can be used to construct the combustion chamber, such as aluminum, titanium, ceramic, brick, or any other material (or combination of materials) that is durable and capable of with standing high temperatures. Likewise, the shape of the combustion chamber is variable and may be any perimeter and three-dimensional shape, so long as it provides an adequate chamber for combustion of fuels. In the illustrative embodiment, the combustion chamber is a cylinder with an inner and a shaped outer wall structure providing an airspace therebetween. In alternate embodiments, the combustion chamber can be a more basic enclosure in which the fuel is enclosed to create a flame and allows for injection of air thereinto in accordance with this invention (described below with reference to an "universal" TEG device).

The TEG housing 110 is provided with a front face 111 that is both an air intake and a user interface. The TEG housing 110 is connected to the portable combustion device 100 with sheet metal brackets. The air intake 112 is covered by a perforated cover plate and behind the plate are an air filter panel and an intake fan. The user interface 114 can include a port 115, e.g., Universal Serial Bus ("USB"), a cold status button 116 and a series of Light-emitting diodes ("LEDs") 117 that indicate the status of the TEG temperature 118 and the battery charge 119. In other examples, the port 115 can be any other type of port, such as a micro-USB, mini-USB, two/three prong outlet, etc.

The portable combustion device 100 is constructed and arranged with an opening 140 that provides access to the interior of the combustion chamber 102. An ash tray 142 is positioned at the bottom of the opening 140 and receives the residue of combustion from the combustion chamber. A fuel feed rack 144 is positioned above the ash tray 142. The fuel feed rack 144 provides for the deliberate insertion of fuel (for example, wood sticks) into the combustion chamber.

The combustion chamber 102 is an enclosed space with the opening 140 on the lower front and a vertical exhaust for the combustion gases that extends to the grill top 120. The combustion chamber is provided with a central combustion chamber 150, an outer combustion chamber wall 152 and an airspace 154 therebetween. The outer combustion chamber wall 152 provides a barrier to protect against the high temperature within the central combustion chamber 150. The air space 154 is a second heat barrier and is between approximately ½ inch in radius and approximately 2 inches in an embodiment.

The illustrative outer combustion chamber wall 152 is constructed from relatively thin-gauge stainless steel as well. However, in an alternate embodiment other durable materials, such as aluminum or a composite material can be employed. In a still further embodiment, the outer combustion chamber wall 152 can be a modular design such that it may be removably secured to the portable combustion device 100.

Figure 2:
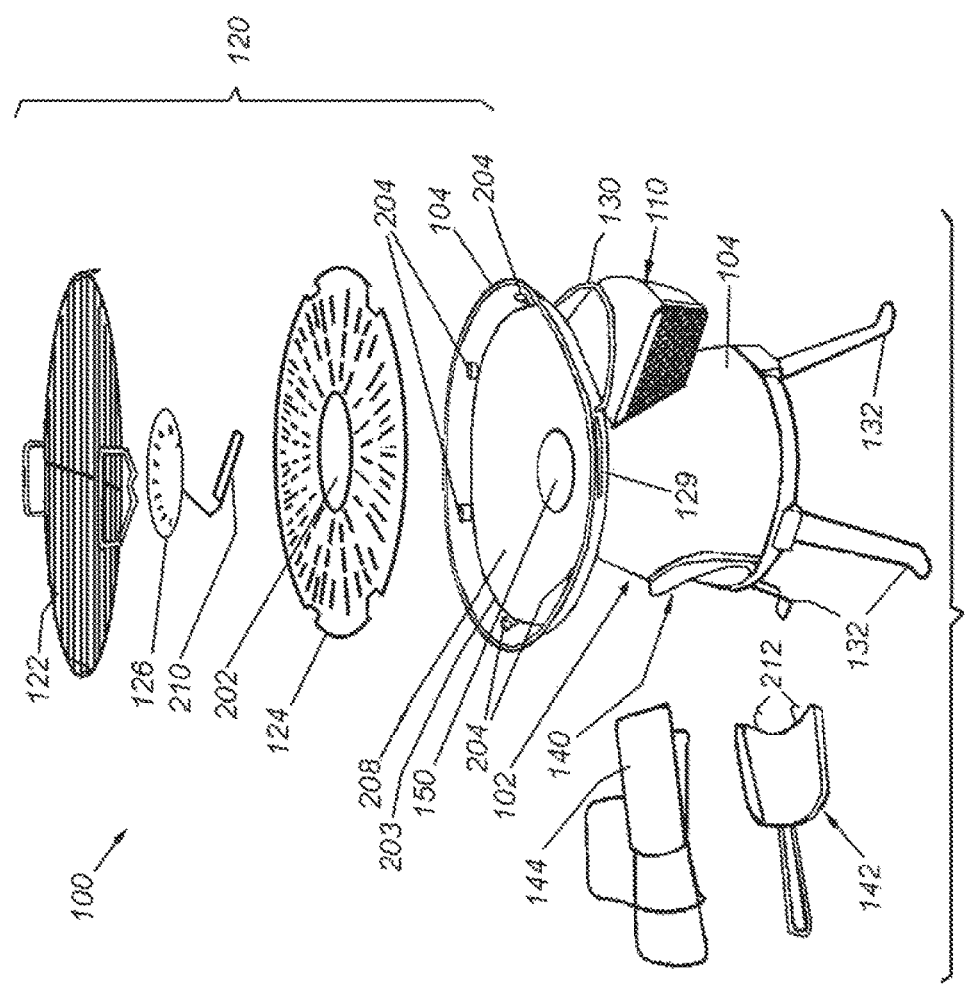
FIG. 2 is an exploded view of the portable combustion device, according to the illustrative embodiment.

FIG. 2 is an exploded view of the exemplary portable combustion device 100 of FIG. 1. The grill top 120 is an assembly comprising a grill grating 11, a perforated heat plate 124 and a lever-operated baffle 126. The heat plate 124 is constructed with a central aperture 202. The interior bottom 203 of the grill top is constructed with a plurality of detents arranged around the perimeter that are supports 204 for the grill grating 122. A central aperture 208 provides an exhaust port for combustion gases rising from the inner combustion chamber 150 directly below. This aperture in turn aligns with the heat plate central aperture 202. The baffle handle 210 extends through the slot 129. The ash tray 142 is provided with two wire hooks 212 for securing the ash tray within the opening 140.

Figure 3:
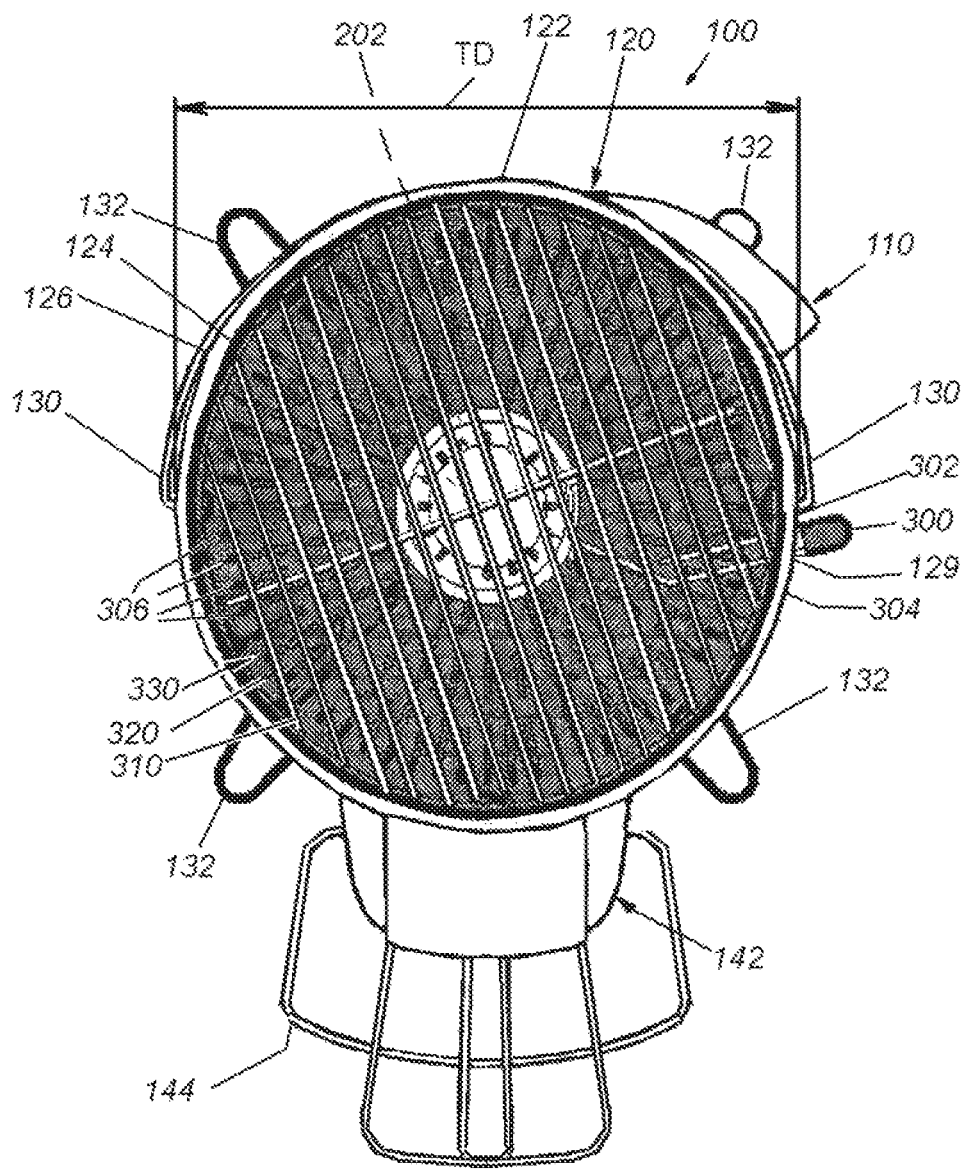
FIG. 3 is a top view of the portable combustion device of FIG. 1 according to an illustrative embodiment.

FIG. 3 is a top view of the portable combustion device 100 with the baffle 126 closed and covering the aperture 202. The baffle handle 300 is a lever that is attached at one end 302 to the heat plate 124 by the engagement of an L-shaped bent end with a hole in the heat plate 124. The baffle handle 300 is attached at the other end 304 to the baffle 126 by a spot-welded joint, or another attachment. Elongated perforations 306 are radially disposed around the central aperture 202 in three rows, 310, 320, 330. In an embodiment, row 310 is provided with 16 perforations 306. Row 320 is provided with 32 perforations. Row 330 is provided with 64 perforations. The perforations 306 are openings that permit combustion gases to pass when the baffle 126 covers the central aperture 202. The radial arrangement of the perforations provides that the thermal heat of the combustion gasses is evenly dispersed as it travels outward from the baffle toward the edge s of the grill. The progression of the perforations evenly heats the grill. In other embodiments, a plurality of holes can be used. The succession of increasing holes as the heat travels outwards from the center maintains and preserves some of the heat so that the outermost edges heat as readily as the central part of the grill. In other embodiments, the number of perforations arranged in each row, the shape of the perforations and the number of rows can vary. The overall diameter TD of the grill top is approximately 14 inches (about 35 cm). In other embodiments, this diameter can be greater.

Figure 4:
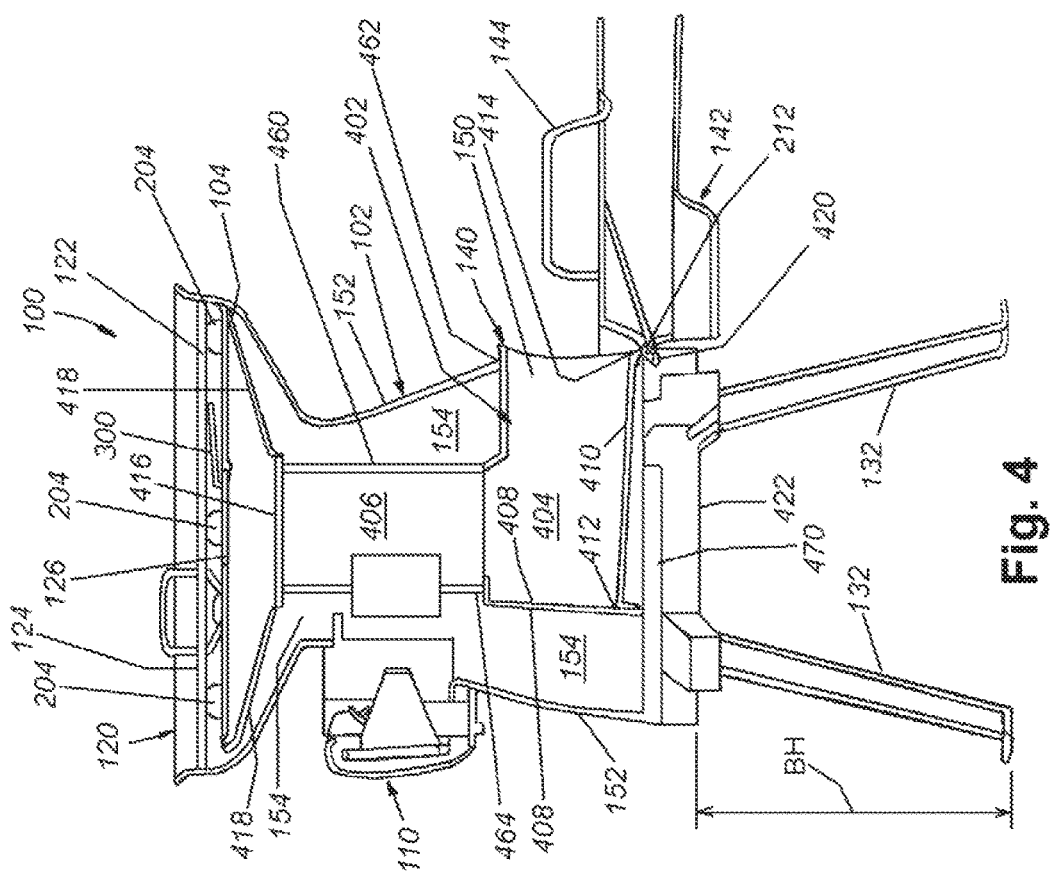
FIG. 4 is a cross-sectional view along lines 4-4 of FIG. 1 according to an illustrative embodiment.

FIG. 4 is a cross-section view that shows the interior of the combustion chamber 102 in greater detail. The central combustion chamber 150 is comprised of three regions, 402, 404, 406. A first region 402 is a lateral chamber that receives the fuel and some combustion can occur in this region. A second region 404 is a combustion chamber that is open at one side where it adjoins region 402, and above, where combustion passes are carried vertically into region 406. A back wall 408 forms the rear of region 404. A sloped floor plate 410 extends from the back wall 408 to the opening 140. The floor plate 410 is higher at its juncture 412 with the back wall 408 than its juncture 414 with the opening 140. This slope carries ash and other combustion residue away from the combustion chamber regions 404, 402 to the ash tray 142 using gravity. Combustion gasses rise from the second region 404 into a third region 406 that functions as a chimney. The heated gasses rise to a top opening 416 and pass into the grill top 120. The top opening 416 is surrounded by a conical grill bottom 418 that is disposed within the grill top 120 and provides a barrier between the more intense heat of the combustion gases and the outer combustion chamber wall 104. The ash tray 142 is connected to the portable combustion device 100 at a lateral slot 420 at the front opening 140 by engagement of hooks 212. The legs 132 raise the portable combustion device 100 so that the bottom 422 is elevated to a height BH above the ground level of approximately 8 inches (20 cm). It should be clear that the dimensions provided herein are exemplary of a device of a given device size and that the relative sizes of components can be varied where a larger or smaller combustion device is desired. In the illustrative embodiment, the inner walls 408, 460, 462, 464 and bottom 470 are constructed from a unitary-stamped or built I up/welded-together construction of stainless steel, and the outer walls 152 and bottom 470 are constructed from sheet aluminum that is formed into the illustrated "pot" shape.

Note, as used herein terms such as up, down, vertical, horizontal, radial, axial, and the like are meant to refer to relative directions in view of the depiction of the device 100 with respect to a conventional horizontal supporting surface with a vertical/perpendicularly directed gravitational field acting thereupon. More generally, as used herein the directional terms, such as, but not limited to, "up" and "down", "upward" and "downward", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity. These terms are meant to be conventions only, and not absolute directions.

II. Mechanical

Figure 5:
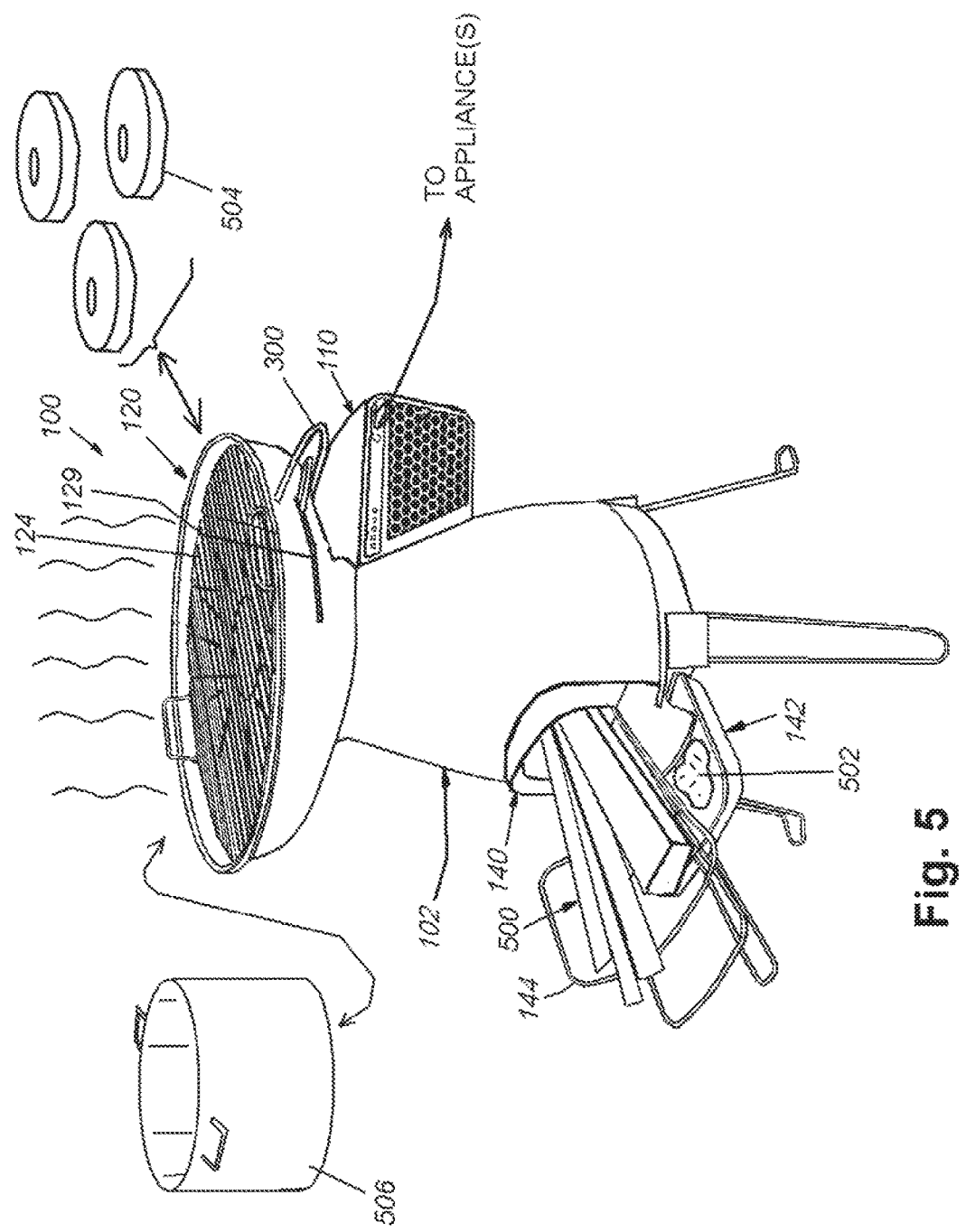
FIG. 5 is perspective view of the portable combustion device in use according to an illustrative embodiment.

The portable combustion device 100 can be utilized for a variety of purposes, including but not limited to producing electricity, heat, grilling and boiling pots of liquids and foods. A combustion source can also be a social gathering focus for people enjoying the out of doors. FIG. 5 shows the portable combustion device 100 in use as a combustion source. Fuel 500 is set in the feed tray, ignited and pushed through the opening 140 into the inner combustion chamber. Residue 502 has emerged from the opening 140 and is deposited in the ash tray 142. This ash tray 142 is removable and can be removed for clearing and cleaning before, during and after the combustion, as desired. The baffle handle 300 is positioned so that the baffle is closed over opening 202 and the combustion gasses are dispersed evenly across the heat plate 124 and passes through the plurality of perforations therein and generally disperse the heat. In this mode, the grill top 120 can handle multiple portions 504 of illustrative grill top food. When the baffle handle 300 is moved in the slot 129 to the opposite end of the slot and the baffle 124 is removed from the opening 202, a direct flow of the combustion gasses can heat a single illustrative vessel 506. This baffle movement is shown more particularly in FIGS. 6-7.

Figure 6:
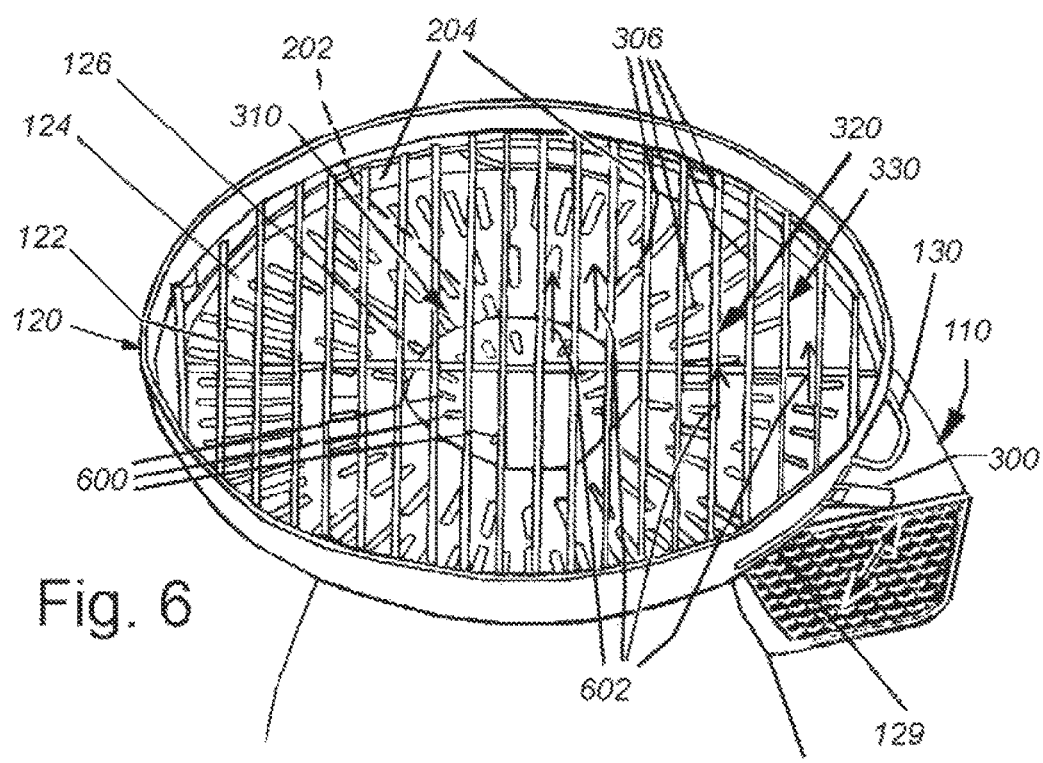
FIG. 6 is a top perspective view of the grill top with a baffle closed according to an illustrative embodiment.

FIG. 6 depicts a grill top 120 with the grill handle 300 residing at one end of the slot 129 and the baffle 126 closing off the opening 202, causing the combustion gases to move laterally across the bottom of the heat plate 124 in a "closed baffle" condition. The gasses pass through rows 310, 320, 300 of various perforations 306. The baffle 126 is provided with a plurality of small perforations 600 to heat the center portion of the grill grating 122. In the closed baffle condition, combustion gasses 602 rise from the array of perforations 600, 306 to warm foods placed upon the grill grating 122.

Figure 7:
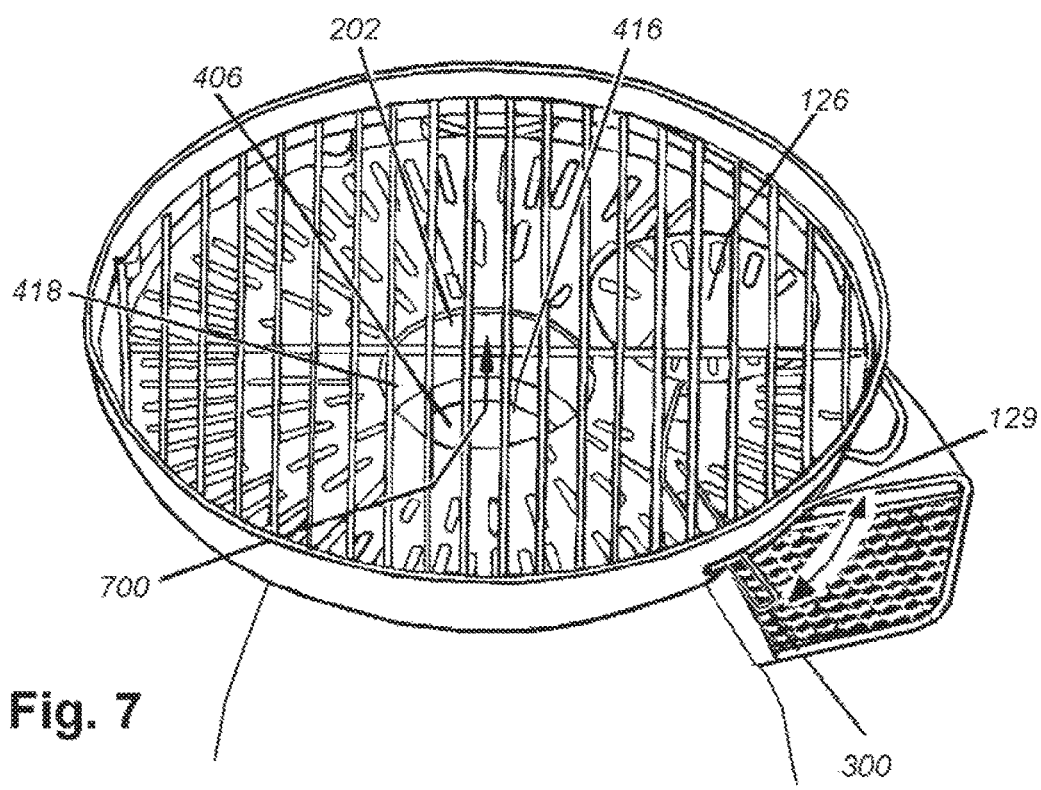
FIG. 7 is a top perspective view of the grill top with a baffle open according to an illustrative embodiment.

FIG. 7 shows the grill top 120 in an "open baffle" condition. This condition is created by the movement of the baffle handle 300 to the opposite end of the slot, causing the baffle 126 to move away from the opening and expose opening 202. As noted above, opening 202 is a direct vertical vent from the inner combustion chamber below. A direct column of combustion gasses 700 rises up the center of the grill top. This baffle condition provides a focused stream of combustion gasses for cooking a single vessel or pot.

III. Electrical

Figure 8:
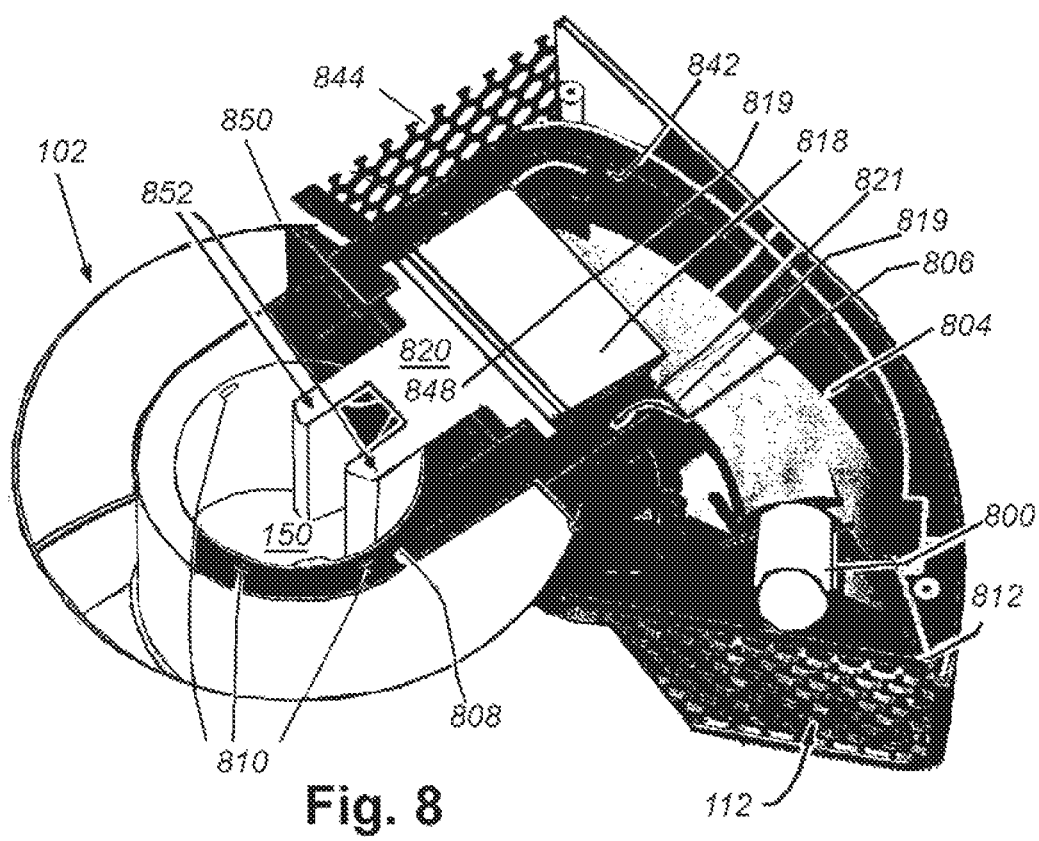
FIG. 8 is a perspective cross-sectional view of the portable combustion device showing the details of the TEG housing according to an illustrative embodiment.

FIG. 8 is a top cross section view of the exemplary portable combustion device 100 showing the TEG housing 110 in greater detail. The TEG housing is constructed and arranged to reside along the outer surface of the combustion chamber 102. The front of the TEG housing 110 has a user interface and a perforated air intake 112. A fan 800 located behind the air intake 112 is operated by a controller, e.g., microprocessor (not shown), draws air into the TEG housing and impels it down a TEG housing channel 804. The air passes through a removable filter element 812 located between the inlet 112 and the fan 800. A portion of the air passes into an inlet 806, through a passage 808 and into the combustion chamber 150 at through a plurality of ports 810 in the wall of the combustion chamber to add pressure to the chamber. Another portion of the air continues to pass through the TEG housing channel 804. This passes through and past a heat sink 819. A heat sink is in close proximity to the cold side of the TEG 818. The heat sink 819 is arranged such that there is a "vee" shaped channel 821 for the air to pass and carry off some of the radiating thermal energy from the heat sink. After passing the heat sink 819, the heated air flows into an outlet 842 and through the exhaust outlet 844. A heat probe 820 passes through a high temperature gasket 850 into the chamber 150. A storage battery (not shown) is located near the inlet and along the outer TEG housing wall 816. The battery is in electrical contact with the controller. The battery storage has a capacity of 3 watt hours. The battery is a rechargeable lithium battery and can be a lithium iron disulfide (Li—FeS2) type battery. In other embodiments, a different type of battery of another capacity can be used and charge capacities can vary accordingly.

The TEG 818 is mounted on a base 848 along the TEG housing inner wall 819. A heat-conducting probe 820 is secured to the TEG housing 110 at the thermally conductive heat-conducting probe base 848, which is in direct, thermally transmitting contact with the "hot side" of a TEG device 818. The heat-conducting probe 820 can be constructed from any acceptable heat-conducting material, such as steel, copper, graphite or aluminum. The heat probe is a solid casting and has a pair of fins 852. The heat probe fins 852 are located in chamber 406, above the combustion and acquire thermal energy for transfer to the TEG 818. The heat probe allows for greater transmission of heat from the combustion area to the TEG as it intercepts the flames created by the combustion. The heat-conducting probe base 822 can be a cast or milled material that is also any acceptable material, such as steel, aluminum, graphite or copper. It should be clear that the make, model and performance specifications of the particular TEG or TEGs (where an array of two or more TEGs is used) employed in an embodiment can vary significantly depending upon power requirements, size and cost, among other factors.

In alternate embodiments, the TEG unit can be an integral section of the combustion chamber, and can be removed with that section of the chamber itself. Such permanent or semi-permanent fixing can be achieved by forming the TEG housing integrally or unitarily with the associated combustion device or applying it to a wall of the device using fasteners (e.g. rivets or screws) that do not lend themselves to rapid removal by only a few movements and/or without tools.

The illustrative TEG housing 110 is a modular design and is a single integrated device. The TEG housing 110 is secured to the combustion chamber 102 with clips, fasteners or other devices known in the art for securing objects together (for example, sheet metal brackets). Likewise, the TEG unit (or units) can be located remote from the combustion chamber and device wall, being connected mainly by an appropriately sized heat-conducting probe and an air conduit in communication with the airflow driver so as to deliver a stream of air from a remote location.

When the TEG housing 110 is securely locked in place against the wall, the passage 808, which is located in the rear of the TEG housing along wall 230, is in engagement with an inlet 810 formed in the combustion chamber. In an illustrative embodiment, the inlet 810 may include a heat-resistant gasket (constructed from silicone, for example) to form a seal between the TEG housing 110 and the combustion chamber 150 in the region of the inlet 810. In other embodiments, a seal between the TEG housing 110 and the combustion chamber 150 can be constructed from durable material capable of withstanding elevated temperatures and providing a sufficient seal between two components.

In general, the TEG is selected for high-hot-side temperature applications due to its exposure to the flame of the combustion chamber. However, where heat exposure is reduced through insulators, and the like, or by sizing the thermal conductivity of the heat probe, a lower-temperature TEG can be employed. High-temperature TEGs are typically assembled using a high-temperature solder and/or similar attachment mechanism. On the opposing, "cold side" of the TEG device 818 is a heat sink 819. There is an electrical connection between the fan 800 and the TEG 818 so that the fan voltage does not have to directly match the TEG voltage. In alternate embodiments, any acceptable fan arrangement can be employed including a radially, directed propeller-style blade set joined to a common hub. In general, the terms "airflow driver" and "fan" should be taken broadly to include any acceptable driven, air-moving/driving structure or device. Clearly, the size and power-handling of the motor as well as the size and airflow of the fan are highly variable. The air flow produced by the fan 800 in part pressurizes the combustion chamber and in part cools the heat sink. In alternate embodiments, the fan and motor can be varied to suit a differing TEG output and/or where multiple TEG/airflow driver assemblies are employed. In an illustrative embodiment the impeller is made of a durable plastic. In alternate embodiments the fan 800 can be made of other materials, such as steel, aluminum or any material known in the art used for making reliable, efficient, and lightweight fan structures.

It is expressly contemplated that the placement of the fan or other airflow-driving mechanism with respect to the TEG and its heat sink is highly variable. Additionally, one or more motors or other driving devices can be arranged to both pull (as shown) and blow airflow with respect to the heat sink. The term "draw" should thus be taken broadly to embody any of these airflow-driving arrangements.

The wiring and circuitry used to connect the TEG and motor have been omitted in the drawing for clarity. The electrical connections and associated control circuitry can be implemented in accordance with well-known electronic principles. As soon as the TEG begins to produce power, the circuitry starts up and the fan begins to move air through the TEG. This occurs during the starting of the combustion process, when kindling is being used. More generally for power storage is useful in supporting various cogeneration arrangements as described further below by ensuring that the output of power is always sufficient to support the requirements of the connected device or devices. Whenever TEG output attains a predetermined output level in excess of draw by the device and/or fan motor, the system's control circuitry engages a charging circuit of conventional design, which replaces the battery's or capacitor's spent energy.

As air is fed into the interior of the inner combustion chamber 150 a more efficient combustion will be created, whereby less fuel is required to transfer heat to the TEG device 818. The result is a feedback system where the heat from the combustion, and cooling of the heat sink, powers the fan 800, which further promotes an increased efficiency of the combustion, reducing the fuel and increasing the efficiency of the combustion. The illustrative embodiment provides a device having a shorter, more-efficient kindling period, as well as substantially more-efficient overall combustion. The use of the conventional biomass-type fuels eliminates the need for purchasing, carrying, and disposing of potentially toxic fuel sources. Additionally, the TEG device 818 eliminates the need for batteries or other external power sources to drive or start the airflow driver that is used to promote the more efficient combustion process. The novel placement and arrangement of airflow-generating and delivery structures also increases the efficiency of the device. The above-described invention generally provides an apparatus and method that is capable of being used in a wide variety of situations, from camping, emergency situations, or used in a developing country as a primary heat and/or cooking source.

FIG. 8A is a diagram of the air flow as depicted in a top view. The air flow enters the air intake 112 and is filtered by the filter 812. The air ten passes through the fan 800 and enters the TEG housing channel 804. A portion passes into inlet 806 and eventually, as set forth above, enters chamber 406. Another portion passes over and through the heat sink 821 and exhausts though the exhaust outlet 844.

Figure 9:
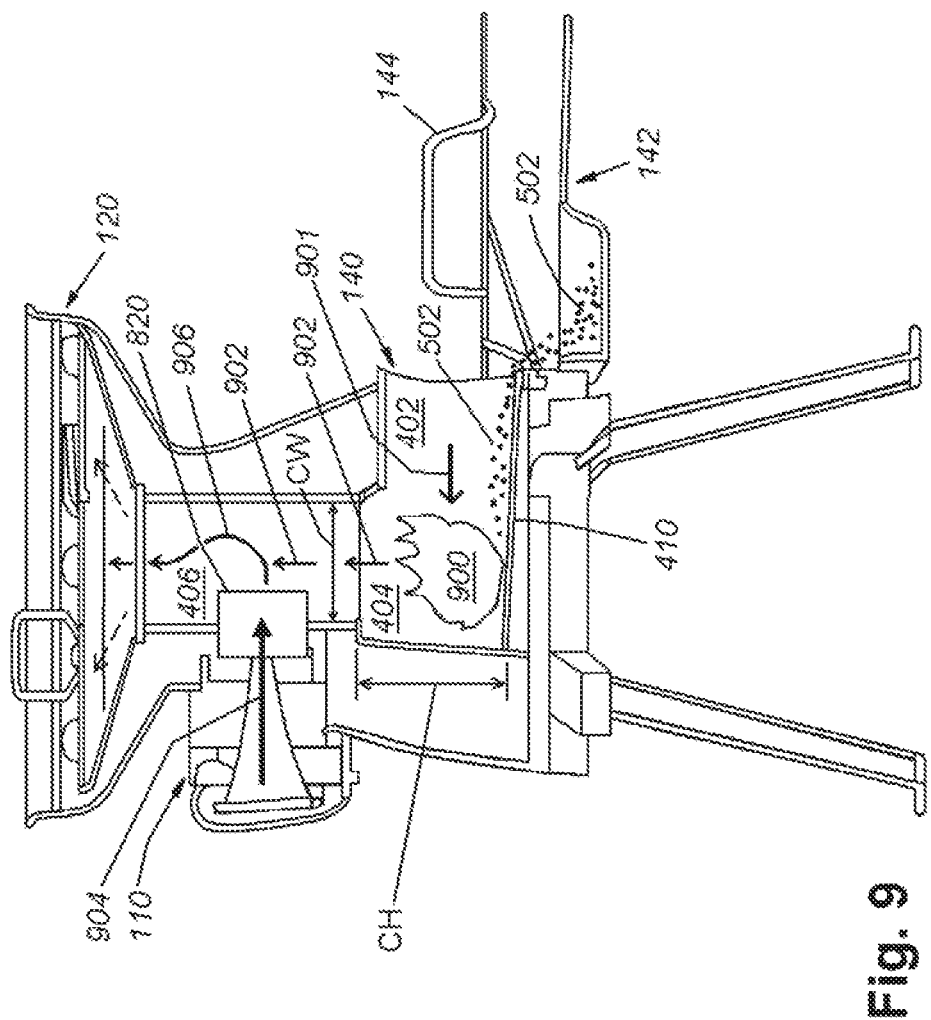
FIG. 9 is a cross-sectional view along lines 4-4 of FIG. 1 showing the airflow movement within the portable combustion device according to an illustrative embodiment.

FIG. 9 is the cross section view of FIG. 4 with the air flow depicted. When a combustion source is ignited and a combustion 900 is initiated, the air begins to be drawn into the opening 140 and a drawing flow 901 begins from the opening to the combustion chamber region 404 where the combustion is occurring. This causes to air flows to begin. A first air flow is the initial upward combustion gas flow 902. A second air flow is initiated by the TEG when it begins to produce a current and the fan 800 starts to draw air into the TEG housing 110 and impel that air through the TEG housing and into the combustion chamber at outlet 810. This flow of air combines with flow 902 to create a flow 906 that drives the gases upwards to the grill top 120.

Figure 10:
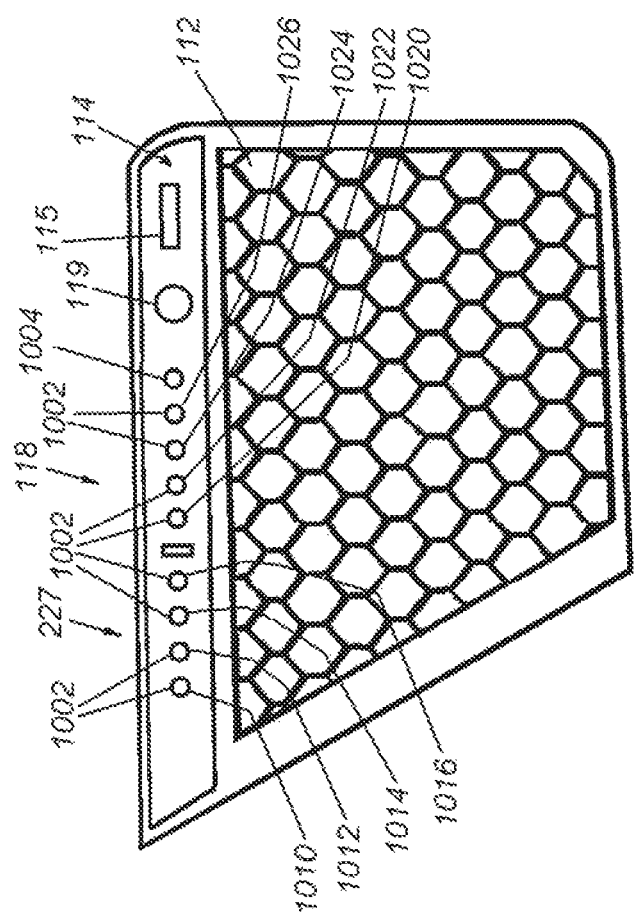
FIG. 10 is a frontal view of the user interface of the portable combustion device according to an illustrative embodiment.

FIG. 10 shows the status interface 114 for the portable combustion device 100 that is positioned on the face of the TEG housing 110. The interface 114 is positioned above air intake 112. The interface is provided with two rows 117, 118 of LEDs 1002, an on/off button 119 and a power on LED indicator 1004. The controller determines the display of LEDs based on the observation by internal probes and the achievement of preset parameters. This can be accomplished by a simple "look up" table in the controller. Rows 117, 118 are arrayed in a series, one beside the other. Each is comprised of 4 LEDs 1002. In other embodiments, the arrangement of the LEDs can vary and the number of LEDs in each row can be greater or lesser than four each, regardless of the other. The LED displays can be actuated by instructions from the controller (not shown). In the illustrative embodiment, a first row 117 of LEDs 1002 displays are arranged in increasing order of the status of the temperature of the "hot" side of the TEG. A second row 118 of LEDs 1002 displays are arranged in increasing order of the status of the battery charge. In other embodiments, the rows can be reversed. The status lights are initiated and will vary in display based on preset settings for temperature and batter charge. With respect to the TEG temperature row 117, the first position LED 1010 represents the lowest temperature. The initiation of the heating/generation stage automatically turns the microcontroller controller on and turns on the display. The "hot" side of the TEG is still relatively cool; the temperature differential between the respective sides of the TEG is low.

Increasing heat causes the temperature to rise along the combustion chamber and the next preset temperature is attained. The controller switches on the second LED 1012. The temperature differential between the respective TEG sides is increasing, and that in turn increases the power output of the TEG. When the next preset temperature setting is reached, the controller turns on LED 1014. As the temperature rises higher, the final preset temperature setting is reached and the controller turns on LED 1016.

The battery charge row 118 shows the charge available by a sequence of LEDs 336 that range from lowest to highest. The controller reviews the charge status according to preset levels. The first LED 1020 is turned on by the controller when the charge is at the lowest level. A second LED 1022 is turned on by the controller at a next preset level. A third LED 1024 is turned on by the controller at a next preset level. A fourth LED 1026 is turned on by the controller at the next and highest preset level. When the portable combustion device is cold and no combustion is taking place, the level of battery charge can be accessed by the on/off switch 119. Indicator light 1004 is illuminated when the TEG is generating power. In an embodiment, the LEDs 1002 are all uniform in color when illuminated. In other embodiments, the LEDs can be color coded (for example, red for the lowest, yellow for the next highest, and green for the highest two).

Figure 11:
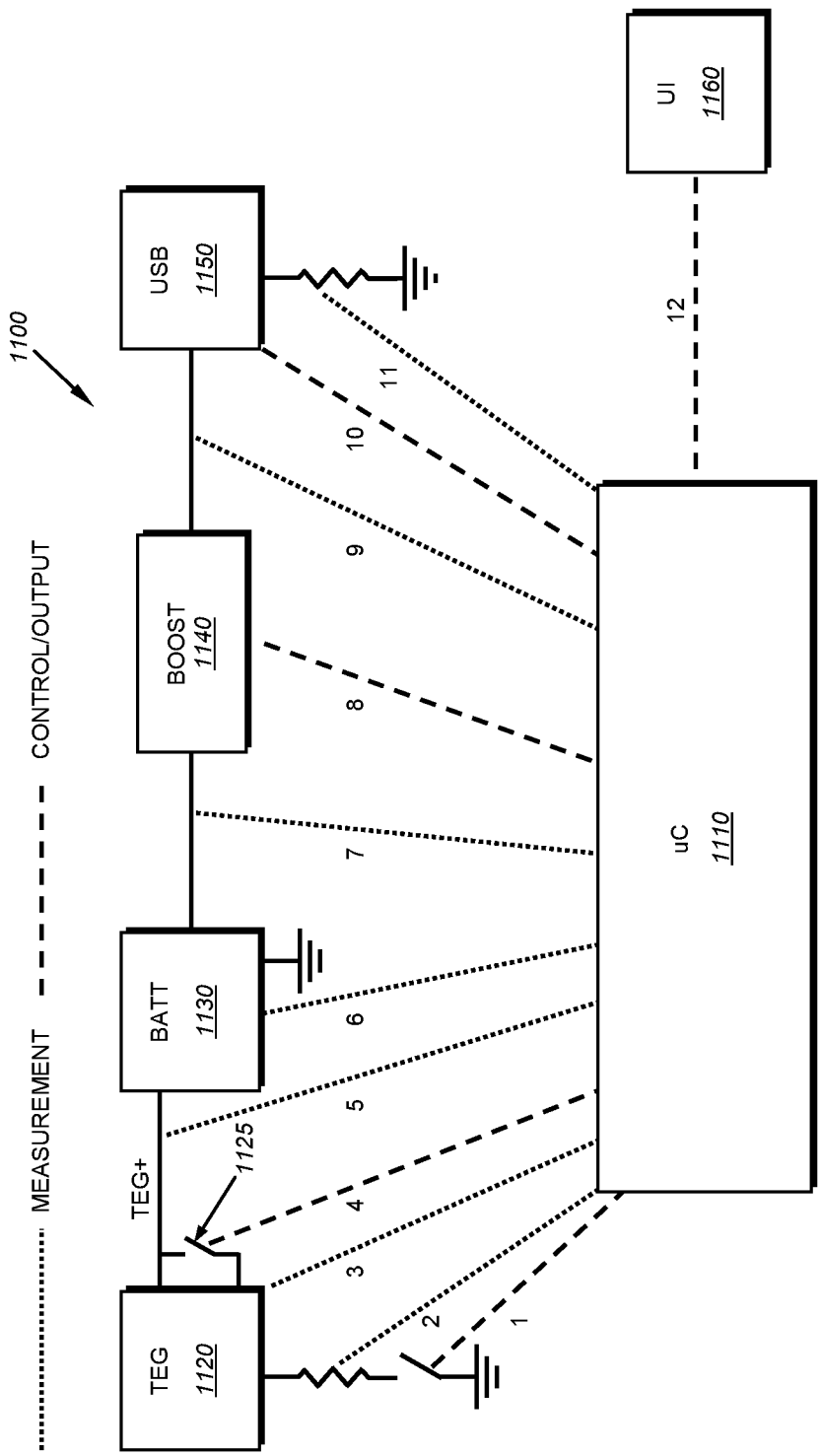
FIG. 11 is a generalized schematic diagram of the TEG unit power circuitry according to an embodiment that includes a cogeneration circuit and power storage capabilities.

FIG. 11 depicts a block diagram of an exemplary control system 1100 of the combustion device 100 according to one or more aspects of the disclosure. As shown, the system 1100 can include a controller 1110. The controller 1110 can be any type of processor, such as an analog microprocessor or digital microprocessor, and can include one or more processors. The controller 1110 can also include a temporary or permanent memory for storing data or instructions that can be called, retrieved, performed, or executed by the controller 1110.

The system 1100 can include a TEG 1120, e.g., TEG 818 as shown above in FIG. 8. As described above, the TEG 1120 can generate an electrical voltage based on a temperature differential between the "hot" and "cold" sides. The magnitude of the voltage can be in proportion to the difference in temperature between the two sides of the TEG 1120.

The TEG 1120 can be directly or indirectly connected to a battery 1130. The battery 1130 can be any type of battery, such as a rechargeable battery. In one example, the battery 1130 can be a lithium-ion battery, such as a lithium-iron disulfide battery. In other examples, any type of battery 1130 can be chosen based on any number of factors, such as physical size, charge/discharge efficiency, discharge rate, cycle durability, or cell voltage.

As discussed above, the TEG 1120 can provide an electrical current to the battery 1130. In turn, the battery 1130 can be charged by the electrical current provided by the TEG 1120. The battery 1130 can store the charge and thereby charge a device connected directly or indirectly to the port 1150. The device can be, for example, a computing device, such as a personal computer, laptop, tablet, mobile phone, smart phone, or wearable computing system. The device can be any other type of device that is capable of being charged and/or discharged.

The controller 1110 can monitor or measure parameters of the TEG 1120 and/or the battery 1130 and control either or both of the TEG 1120 and/or battery 1130 based in part on the monitored or measured parameters. For example, the controller 1110 can monitor a current output of the TEG 1120. If the current output is too high, e.g., greater than a current threshold, this can indicate that there is a malfunction of the TEG 1120. As described above, this can result in mechanical damage to the TEG 1120 or the portable combustion device 100 in general. In this regard, the controller 1110 can compare the current output to a first current threshold such that, when the current is greater than the first threshold current, a warning or alarm is displayed at the user interface 1160, or additionally or alternatively, the device 100 is disabled. In another example, the controller 1110 can monitor a temperature of the cold side of the TEG 1120. In this regard, if the temperature of the cold side is greater than a predetermined temperature threshold, then an alarm or warning state may be displayed at the user interface 1160 or additionally or alternatively, the device 100 is disabled. The first current threshold can be any threshold, and can be predetermined, stored in a lookup table, or can be determined by an algorithm.

Additionally, if the current output of the TEG 1120 is too low, e.g., is below a second threshold current, this can indicate that the TEG 1120 is no longer exposed to the temperature differential necessary to generate a current. In this regard, the controller 1110 can deactivate any of the battery 1130, boost circuit 1140, port 1150, or user interface 1160 in this condition to prevent further discharge of current to a device.

The controller 1110 can also monitor the temperature or voltage output of the battery 1130. In some examples, a battery temperature that is too high can indicate a state of overcharge and can result in battery failure. In this regard, the controller 1110 can compare a sensed battery temperature to a threshold battery temperature. If the sensed temperature is greater than the threshold temperature, the controller 1110 can activate a short circuit 1125 that at least temporarily directs current away from the battery to allow the temperature to return to a lower level. The threshold can be a predetermined threshold based on the selected battery 1130, or can be preset, stored in a lookup table, or can be determined by an algorithm.

The controller 1110 can also monitor the voltage output of the battery 1130. If the voltage output of the battery 1130 exceeds a first threshold voltage, the controller 1110 can activate a short circuit 1125 connected to the TEG 1120 to prevent any further charging of the battery. If the voltage output of the battery 1130 falls below a second threshold, which can be lower than the first threshold, the TEG 1120 may deactivate the short circuit 1125, thereby allowing current to charge the battery 1130 once again. The selection of first and second thresholds may be predetermined, or may be done according to look-up table or algorithm stored on a memory of the controller 1110.

The battery 1130 can connect directly or indirectly to a boost circuit 1140, e.g., a boost convertor or a step-up circuit. The boost circuit 1140 can output a voltage that is greater than an output voltage of the battery 1130. In this regard, the output voltage of the boost circuit 1140 can be selected according to any number of factors, such as the voltage requirements of a connected device. Based on the selection of TEG 1120, battery 1130, and boost circuit 1140, the power output of the boost circuit 1140 can have a maximum output of 12 watts and can provide a continuous power output of approximately 8 watts.

The boost circuit 1140 can be connected directly or indirectly to a port 1150. The port 1150 can be any type of port, such as a USB port, micro-USB port, mini-USB port, or any other type of port capable of connecting to an electronic device. In other examples, the port 1150 can transmit data from the controller 1110, or a memory of the controller 1110, to an electronic device connected thereto. In yet another example, the port 1150 can be a conventional two or three-prong outlet.

The controller 1110 can also connect to a user interface 1160. The user interface can be any type of user interface, such as one or more status indicators, one or more audio alerts, a display device, a touch screen, or any other type of interface that can accept user input or indicate a status.

It should be clear that the above-described embodiments provide a highly versatile device combustion-enhancing and/or energy-generating for both portable and fixed-base applications. The design lends itself to integration in many types of cooking and heating arrangements, using a variety of fuels and techniques for venting air and exhaust gasses. The various embodiments are relatively inexpensive to produce, low- or no-maintenance and easy to use. Such designs are, thus, well suited to camps and bush environments, as well as use in developing countries.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, as used herein to describe the portable combustion device, the term "smoke-free" or "waste-free" is intended to mean that the device operates by burning a fuel while producing very little to no smoke as it burns the fuel. The term "TEG" as used herein should be taken broadly to refer to a variety of equivalent devices that are capable of converting heat form a source into electrical energy in a manner that can be used in accordance with the general arrangement of components described and contemplated in accordance with this invention. The TEG device can comprise an array of devices, each in communication with a portion of the heat source/flame where appropriate. Likewise, while an exemplary size range is provides, this is only an example and this invention contemplates larger or smaller-scale device where appropriate. The combustion device as described herein has been largely cylindrical in shape with a generally circular perimeter, particularly the combustion chamber and heat shield. However, its perimeter may define any cross-sectional shape including square, rectangular, triangular, and the like. The stove or other combustion arrangement can be constructed and arranged to receive initial and/or replacement fuel from any position, including, but not limited to bottom-feed, top-feed and side-feed. Also, while the cross-sectional shape of the probe is generally circular (cylindrical), the cross section can vary. For example, the cross section shape can be rectangular, polygonal, ovular or irregular. Likewise, the grill top can be constructed and arranged in other polygonal shapes, e.g., a square or rectangle. In addition, while the depicted embodiment provides a single combustion chamber 102 for the overall device 100, it is expressly contemplated that the device can include a plurality of individual combustion chambers with respective standoffs for receiving individual cooking implements, etc. In such a multi-burner implementation, each burner can be serviced by an interconnected TEG system that provides forced air throughout the burner group at all times, or by individual TEG units that are independently operated based upon the heat present in that particular burner. Likewise, each burner (in either a single or multiple-burner device) can have more than one TEG unit. This can be, in part dependent on the overall size and capacity of the particular burner. For example, a smaller-scale burner such as combustion chamber 102 may require a single TEG unit, while a larger diameter/volume burner may require multiple TEG units (housings 110) positioned at predetermined locations on the device. In this manner, a single size and shape housing can be used on a variety of device sizes and scales, by changing the number of units mounted thereon.

Additionally, while the airflow driver in the depicted embodiments is generally a fan, such as an impeller, the energy can be used to store air pressure (using a compressor and storage tank), for release at appropriate times (and in appropriate volume) via a valve and conduit. Alternatively, the airflow driver can comprise a compressor or suction pump that draws air at a desired rate. As device that generates desired airflow can be considered an airflow driver for the purposes of this description. Furthermore, while the combustion chamber of the illustrative combustion device is depicted as comprising a plurality of metal segments welded together to form a surface for receiving an item such as a skillet or other device for heating food or any other substance desired to be heated, any appropriate supporting structure may be employed for placing an item atop the combustion chamber so that it may be heated, such as a skillet for cooking food. Accordingly, this description is meant to be taken only by way of example, and not to otherwise limit the scope of this invention.

What is claimed is:

1. A combustion device comprising:
 a combustion chamber comprising an inner wall defining a combustion space that contains, and is in communication with, a biomass fuel source and an outer wall having a side-mounted interface port allowing access of airflow into the combustion space enclosed within the outer wall;
 a thermoelectric generator (TEG) housing located outside the outer wall and including at least one thermally connected heat-conducting probe on a hot side thereof that extends into the combustion space, the TEG further including a heat sink thermally connected to a cold side thereof;
 a motorized airflow driver electrically connected to the TEG and constructed and arranged to drive air from an ambient source, over the heat sink and into the interface port so as to generate a positive pressure in the combustion space.

2. The combustion device of claim 1, further comprising a heat transfer element arranged so as to adjustably transfer heat generated by the combustion chamber to an external location.

3. The combustion device of claim 2 wherein the heat transfer element includes baffle that, in a closed baffle condition, disperses combustion across the external location.

4. The combustion device of claim 3, wherein the external location includes a cooking surface.

5. The combustion surface as set forth in claim 4 wherein the cooking surface comprises a grill top.

6. The combustion device of claim 1, further comprising a rechargeable battery connected to the TEG.

7. The combustion device of claim 6, further comprising a port configured to connect to an electric device such that the electric device is charged by the battery.

8. The combustion device as set forth in claim 1 wherein the combustion chamber device is constructed and arranged to be portable.

* * * * *